March 29, 1949.  M. W. MARIEN  2,465,521
PISTON RING
Filed March 29, 1946
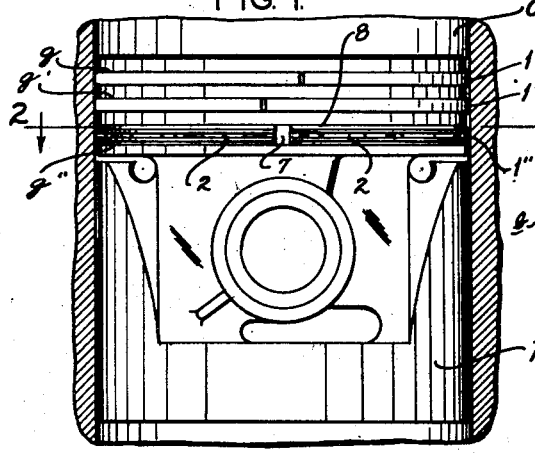
FIG. 1.
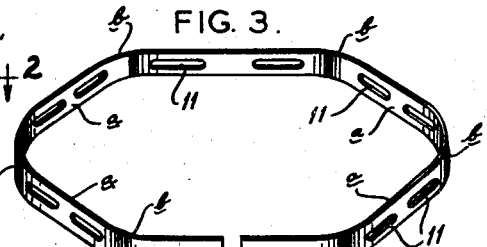
FIG. 3.
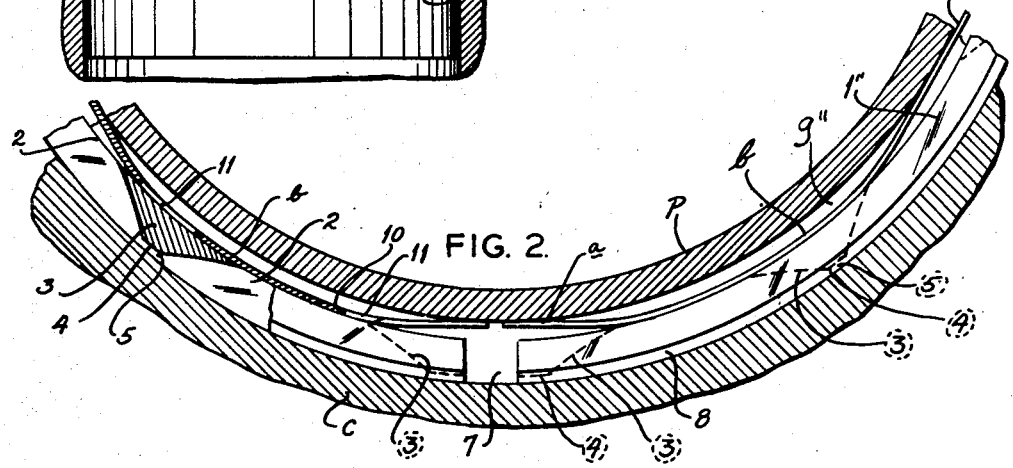
FIG. 2.
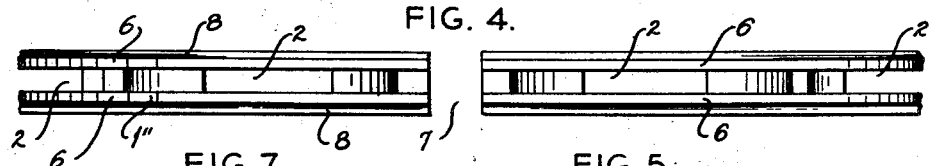
FIG. 4.
FIG. 7.    FIG. 5.    FIG. 6.
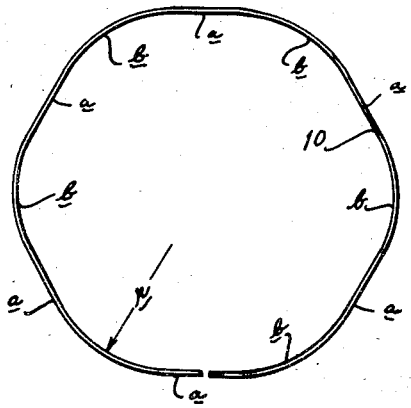
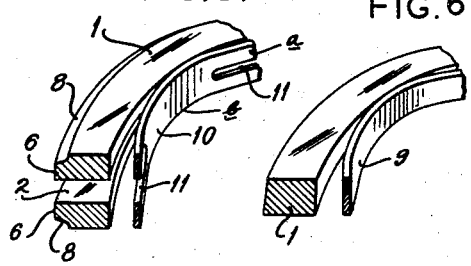
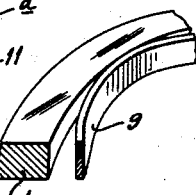
INVENTOR:
MELVIN W MARIEN
BY
ATTORNEY.

Patented Mar. 29, 1949

2,465,521

UNITED STATES PATENT OFFICE 2,465,521

PISTON RING

Melvin W. Marien, St. Louis, Mo., assignor to Ramsey Corporation, Wilmington, Del., a corporation of Delaware Application March 29, 1946, Serial No. 658,008

3 Claims. (Cl. 309—45)

My invention has relation to improvements in piston packing rings and it consists in the novel features of construction more fully set forth in the specification and pointed out in the claims.

The present invention is for a packing ring and embodies two elements—an outer ring element for contact with the cylinder wall, and an inner stabilizing element for backing up the ring. The stabilizing element is a spring of general polygonal shape similar to the well known piston ring expander but differs fundementally therefrom in its action, in that the ring does not obtain its spring pressure from the stabilizer which merely serves to steady the ring action and prevent "ring flutter."

Many other advantages are inherent in my improved packing ring, such as—

1. Quick action.
2. Minimum drag on cylinder wall.
3. Long life due to minimum stress and strain.
4. Low pressure loss after installation.
5. High spring rate combined with low operating pressure.

All these advantages will be more apparent from a detailed description of the invention in connection with the accompanying drawings in which—

Figure 1 is a side elevation of a conventional piston head equipped with my improved packing ring; Fig. 2 is an enlarged horizontal cross-section taken on the line 2—2 of Fig. 1 with parts broken away; Fig. 3 is a perspective view of the ring stabilizer; Fig. 4 is an enlarged side elevation of the oil ring in the lower groove with parts broken away; Fig. 5 is combined cross-section and perspective of a portion of the oil ring; Fig. 6 is a view similar to Fig. 5 showing the compression rings; and Fig. 7 is an edge view of the stabilizer in its free state.

Referring to the drawings P represents a conventional piston operable in a cylinder C, said piston having grooves $g$, $g'$ and $g''$ for receiving piston packing rings $1$, $1'$ and $1''$. The ring $1''$ is essentially an oil ring. The present invention is equally applicable to both compression and oil rings so the detailed description will be directed only to the oil ring $1''$.

The ring $1''$ has a plurality of radial slots $2, 2$ etc. centrally disposed and of a width equal approximately to one-third the total width of the ring. These slots are separated by pillars $3, 3$ etc. across the outer faces $4, 4$ of which are channels $5, 5$ etc. which connect adjacent slots $2, 2$. The merging of the slots $2$ and channels $5$ provide two narrow cylinder contacting faces $6, 6$ spaced apart entirely around the ring from one of the terminal pillars $3'$ to the other adjacent to the ring gap $7$.

The upper and lower outer corners of ring $1''$ are provided with beveled edges $8, 8$ whereby the cylinder contacting faces $6, 6$ are still further reduced in width. The bevels $8, 8$ may be either plane surfaces or a combination of plane and curved surfaces (as shown) and serve as oil reservoirs when the ring is functioning in the groove for lubricating the upper reaches of the cylinder. In the manufacture of the rings the extent of the bevels $8$ may be varied for controlling the extent of the upper cylinder lubrication. It should also be noted that with respect to both the slots $2$ and bevels $8$ the surfaces are smooth and there are no obstructions or corners to impede the free flow of oil and permit carbon accumulations.

Behind each of the rings $1$ and $1'$ there is a stabilizer $9$ and behind oil ring $1''$ there is a stabilizer $10$, said stabilizers differing only in that stabilizer $10$ is provided with oil ventilating slots $11$. The stabilizers $9, 10$ are essentially springs formed in a substantially polygonal shape. However, the flat sides $a, a, a$, etc. are connected by rounded corners $b, b$, etc. having a comparatively large radius $r$ so that the polygonal shape approaches circularity resulting in a small spring lift (Fig. 7). The large radius of the corners or crimps $b$ also provides a long bearing area between the stabilizer $9$ or $10$ and rings $1, 1'$ or $1''$ which minimizes wear and increases the stability of the ring in action.

The stabilizer is provided with oil vents $11, 11$ in the flat sides $a, a$ which contain the points of minimum bending moment so that the stressing of the stabilizer is not seriously affected.

While the stabilizer is relatively heavy, it is designed to exert very little pressure on the ring since the ring pressure is built into the ring itself. This is a wide departure from the old style ring and expander where the ring pressure against the cylinder wall was obtained primarily from the expander. The reason for thus departing from the heretofore expander practice is to obtain a high resistance against collapse in operation.

Due to the variations in the cylinder diameter under temperature changes the piston clearances will also vary. Compromises in engine design have heretofore been resorted to for the purpose of taking care of these variations and avoiding piston teetering and piston slap. My improved ring construction embodying a stabilizer having low spring lift but high spring resistance as above set forth insures stability of the piston throughout all the conditions encountered during the operation of the engine.

The herein described ring and stabilizer, unlike the old style ring and expander, are primarily intended for use in new engines and utilize the basic principle of the expander type ring to the fullest possible extent in preventing "ring flutter," piston vibration, piston rocking and piston slap. The limited stabilizing action of the expander is developed to the highest degree in my improved stabilizer.

The merits of conventional type snap rings, such as quick action and minimum drag on the cylinder wall are combined with effective oil control and compression sealing together with long ring, piston and cylinder life.

These properties may be further augmented by plating both the rings and the stabilizer with chromium or other metal having similar properties.

Having described my invention, I claim:

1. In combination with a piston for operation in a cylinder of an internal combustion engine, said piston having a ring groove, a piston ring in said groove, said ring having inherent spring tension to retain effective contact with the cylinder wall in action, and a stabilizer confined in said groove between the ring and the groove bottom, said stabilizer comprising a ribbon of metal bent to a substantially polygonal shape having alternate straight sides and connecting rounded corners to constitute a series of spring elements, the lift of said elements being approximately equal to the clearance between the ring and the bottom of the groove.

2. In combination with a piston for operation in a cylinder of an internal combustion engine, said piston having a ring groove, a piston ring in said groove, said ring having inherent spring tension to retain effective contact with the cylinder wall in action, and a stabilizer confined in said groove between the ring and the groove bottom, said stabilizer comprising a ribbon of metal bent to a substantially polygonal shape having alternate straight sides and connecting rounded corners to constitute a series of spring elements, the lift of the spring elements being of such dimension that said elements remain substantially inert when the ring contacts the cylinder wall substantially throughout its circumference.

3. In combination with a piston for operation in a cylinder of an internal combustion engine, said piston having a ring groove, a piston ring in said groove, said ring having inherent spring tension to retain effective contact with the cylinder wall in action, and a stabilizer confined in said groove between the ring and the groove bottom, said stabilizer comprising a ribbon of metal bent to a substantially polygonal shape having alternate straight sides and connecting rounded corners to constitute a series of spring elements, the lift of said elements being approximately equal to the clearance between the ring and the bottom of the groove, whereas to impart pressure to the piston ring only when said ring ceases to contact the cylinder wall.

MELVIN W. MARIEN.

REFERENCES CITED

The following references are of record in the file of this patent:

UNITED STATES PATENTS

| Number | Name | Date |
| --- | --- | --- |
| 1,694,566 | Solenberger | Dec. 11, 1928 |
| 1,813,792 | Wuerfel | July 7, 1931 |
| 1,888,994 | Marien | Nov. 29, 1932 |
| 2,362,673 | Smith | Nov. 14, 1944 |